US008738580B2

(12) United States Patent
Thadvai

(10) Patent No.: US 8,738,580 B2
(45) Date of Patent: May 27, 2014

(54) COPYING FILES FROM ONE DIRECTORY TO ANOTHER

(75) Inventor: Satyanarayana Reddy Thadvai, Hyderabad (IN)

(73) Assignee: Nvidia Corporation, Santa Clara, CA (US)

( * ) Notice: Subject to any disclaimer, the term of this patent is extended or adjusted under 35 U.S.C. 154(b) by 1185 days.

(21) Appl. No.: 12/178,593

(22) Filed: Jul. 23, 2008

(65) Prior Publication Data

US 2010/0023563 A1   Jan. 28, 2010

(51) Int. Cl.
G06F 17/30   (2006.01)

(52) U.S. Cl.
CPC ............................. *G06F 17/30076* (2013.01)
USPC ........................................ 707/651; 707/805

(58) Field of Classification Search
CPC ............................................. G06F 17/30076
USPC .......... 707/609, 640, 644, 713, 770, 651, 805
See application file for complete search history.

(56) References Cited

U.S. PATENT DOCUMENTS

| 5,295,261 | A  | * | 3/1994  | Simonetti ..................... 707/716 |
| 5,465,365 | A  | * | 11/1995 | Winterbottom ................ 707/803 |
| 7,403,769 | B2 | * | 7/2008  | Kopra et al. ................. 455/414.1 |
| 7,660,853 | B2 | * | 2/2010  | Scott et al. ..................... 709/205 |
| 2002/0049760 | A1 | * | 4/2002 | Scott et al. ..................... 707/770 |
| 2003/0004940 | A1 | * | 1/2003 | Igarashi ......................... 707/769 |
| 2003/0182402 | A1 | * | 9/2003 | Goodman et al. ............ 709/220 |
| 2004/0267752 | A1 | * | 12/2004 | Wong et al. .................... 707/610 |
| 2005/0216855 | A1 | * | 9/2005 | Kopra et al. ................... 715/767 |
| 2005/0246626 | A1 | * | 11/2005 | Lai ................................ 715/513 |
| 2007/0005581 | A1 | * | 1/2007 | Arrouye et al. ................ 707/713 |
| 2008/0040370 | A1 | * | 2/2008 | Bosworth et al. ............. 707/803 |
| 2010/0332454 | A1 | * | 12/2010 | Prahlad et al. ................ 707/654 |

FOREIGN PATENT DOCUMENTS

| JP | 2000207264 | 7/2000 |
| JP | 2001346135 | 12/2001 |
| JP | 2002268931 | 9/2002 |
| JP | 2002358226 | 12/2002 |
| JP | 2003288247 | 10/2003 |
| JP | 2006260176 | 9/2006 |
| JP | 2007079685 | 3/2007 |
| JP | 2007148739 | 6/2007 |
| JP | 2007310603 | 11/2007 |
| TW | 200818907 | 4/2008 |
| WO | 2004034184 | 4/2004 |

* cited by examiner

*Primary Examiner* — Shahid Alam

(57) ABSTRACT

An aspect of the present invention stores files of a source directory in a target directory. In an embodiment, a unique identifier is generated for each of the files and a new location and a new name are generated for the file. The new location represents the specific sub-directory of the target at which the file is stored. The file is stored at the new location with the new name. Such storing in a new location with a new name can be advantageously used to address various issues in corresponding environments. In one environment, the target directory is stored in an embedded system, with limited resources and the source directory contains several files with substantial overlapping names (which can require substantial resources to search for a specific file). The unique identifiers are generated according to media transfer protocol (MTP), which generates an object identifier for each of the files/directories, etc.

10 Claims, 4 Drawing Sheets

COPYING FILES FROM ONE DIRECTORY TO ANOTHER

BACKGROUND

1. Technical Field

The present disclosure relates to storing files in a digital processing system and more specifically to copying files from one directory to another.

2. Related Art

A file generally refers to a collection of data elements stored in a memory. In a common scenario, a desired content (e.g., song, text edited by a word processor, etc.) is stored in a non-volatile memory as a logical sequence of bytes. The secondary storage is some times provided within a digital processing system accessing the files and some times externally in other systems (e.g., another general digital processing system or specialized filed servers, etc.).

Files are often organized in the form of directories organized in a hierarchy. A hierarchy implies a number of levels, with each directory typically being identified by a name. A directory at a lower level is often referred to as a sub-directory and a directory at an immediate higher level as a parent directory. The top level may be referred to as a root level, with files/directories starting from the root. Files can be placed at any level of the hierarchy.

There is often a need to copy files from one directory to another. For example, it may be desirable to copy songs stored in one directory of one system to another system. It may be desirable to copy songs/files while meeting various requirements specific to that environment.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention stores files of a source directory in a target directory. In an embodiment, a unique identifier is generated for each of the files and a new location and a new name are generated for the file. The new location represents the specific sub-directory of the target at which the file is stored. The file is stored at the new location with the new name. Such storing in a new location with a new name can be advantageously used to address various issues in corresponding environments.

In one environment, the target directory is stored in an embedded system, with limited resources and the source directory contains several files with substantial overlapping names (which can require substantial resources to search for a specific file). The unique identifiers are generated according to media transfer protocol (MTP), which generates an object identifier for each of the files/directories, etc. The file name and location are generated using the object identifier as the unique identifier. Enhanced security and throughput performance are obtained as a result in the embodiments described below.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Environment

Figure 1:
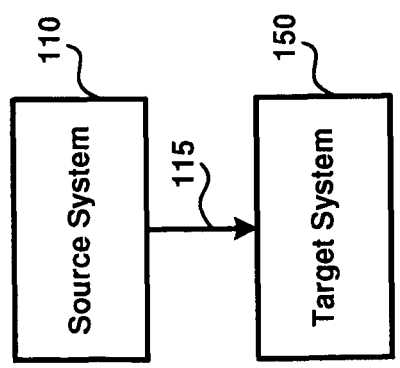
FIG. 1 is a block diagram illustrating an example environment in which several features of the present invention can be implemented.

FIG. 1 is a block diagram illustrating an example environment in which several aspects of the present invention can be implemented. The block diagram is shown containing source system 110 and target system 150. Source system 110 stores multiple files in a source directory. Target system 150 represents another system to which the files are copied. The two systems may be connected (path 115) by technologies such as networks (e.g., those based on TCP/IP, LAN, ATM, etc.) and point-to-point connections (e.g., dial-up).

The manner in which the files can be copied according to several aspects of the present invention is described below in further detail with examples. For illustration, it is assumed that the files are copied from a (source) directory in source system 110 to another (target) directory in target system 150. However, the source and target directories can be in the same system as well.

3. Copying Files

Figure 2:
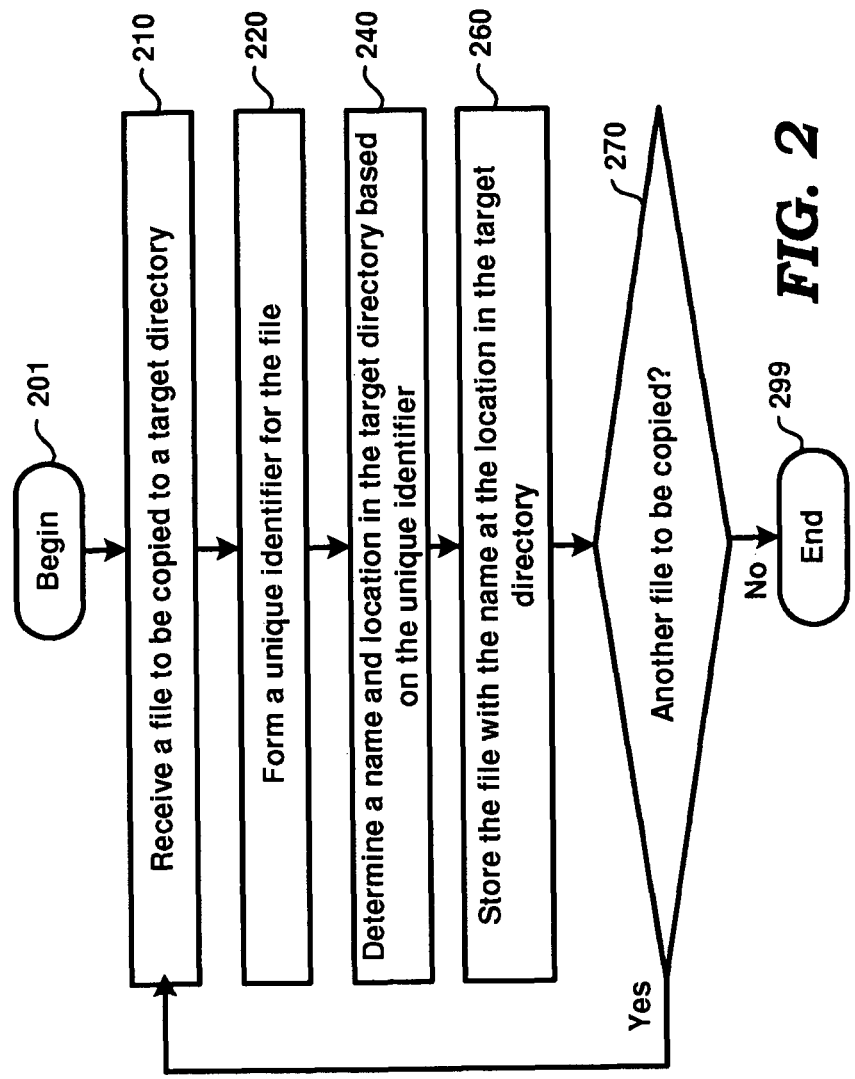
FIG. 2 is a flow chart illustrating the manner in which files in a source directory can be copied to a target directory in an embodiment of the present invention.

FIG. 2 is a flowchart illustrating the manner in which files are copied to a target directory according to an aspect of the invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, target system 150 receives a file to be copied to a target directory. In general, the file has a name and also content (in the form of a sequence of bytes typically). The file may be located in a first location in a directory on source system 110.

In step 220, target system 150 forms a unique identifier for the file. In general, each of the files to be copied needs to be provided with a corresponding unique identifier. The unique identifiers can be generated in various ways, as suited for the specific environment.

In step 240, target system 150 determines a name and location in the target directory based on the unique identifier. This implies the unique identifier is used (as an operand) in computation of the name and location. The location specifies individual subdirectory of the target directory at which the file is to be stored.

In step 260, target system 150 stores the file with the name at the location in the target directory. The storing entails copying the content of the file in the appropriate places of a memory (on which the target directory is stored) consistent with a file system employed in storing the files.

In step 270, target system 150 checks whether there are more files to be copied. Assuming the files are already present in a source directory, there would be additional files if not all files are copied to the target directory. On the other hand, if the files are being dynamically being generated and received in step 210, there would be an additional file for copying when such file additional file is generated.

Control passes to step 210 if there are more files and to step 299 otherwise. The loop of steps 210-270 is performed for each of the files to be copied, with each file being treated as 'a file' of step 210 above. Once all the files are copied, the flow chart ends in step 299.

It should be appreciated that the copying of FIG. 2 can be applied in various environments to meet the corresponding requirements or address the problems presented in that environment. The description is continued with respect to applying the various features of above to address an example set of problems.

4. Example Problems

In one embodiment, the files to be copied are present on source system 110 and are to be copied to target system 150, representing an embedded system. It is further assumed that each file represents a song, though in alternative embodiments, the content can represent some other information. All the files are also assumed to be in a single directory.

Each file is further assumed to have a long name with a substantial overlapping (or same or common) portion. For example, a first file may have a name of "movie name musician name song 1" and a second file may have a name of "movie name musician name song 2". In this example, the portion "movie name musician name song" represents the substantial overlapping portion and the values 1 and 2 the different portions.

Being an embedded system, target system 150 is assumed to have limited resources (e.g., processing power) and also that information security is a desired feature. When a file is to be searched based on a file name, the search may consume substantial resources. For example, assuming a character by character comparison is employed, a conclusion of absence of match may require comparison with all of the substantial overlapping portion, which would lead to enhanced computational requirements.

There might be security exposure as well in terms of using the same file name as in the source directory since any third party intruder would understand the nature of the content of the file by looking at the file name.

Several aspects of the present invention address at least such concerns as described below in further detail in an example embodiment. The embodiment uses media transfer protocol (MTP) and accordingly a brief description of MTP is provided first.

5. Media Transfer Protocol

Media Transfer Protocol(MTP) is a protocol specification for transferring media content to an embedded device using any of the transport mechanisms such as USB or IP. Only the details of MTP as believed to be relevant for the understanding of the operation of the described embodiments is provided herein. For further details of MTP specification, the reader is referred to a document entitled, "Media Transfer Protocol Enhanced", Revision 0.96, dated Aug. 31, 2006, available from Microsoft Corporation, Redmond, Wash.

MTP represents each entity of interest as an object. Every object is associated with some set of properties and optionally with some data. All the entities such as folders, media files, text files, binary files, play lists are treated as objects with distinguished set of properties. Thus, an external application/device interfacing with MTP operates at the object level (instead of block level, wherein block represents a unit of storage on the secondary storage which eventually stores the data of interest). MTP can be supported by various underlying file systems, though MTP would have its virtual view in terms of objects, properties and associations.

The manner in which MTP can be used in copying of files to a target directory is described below with examples for illustration.

6. Target Device

Figure 3:
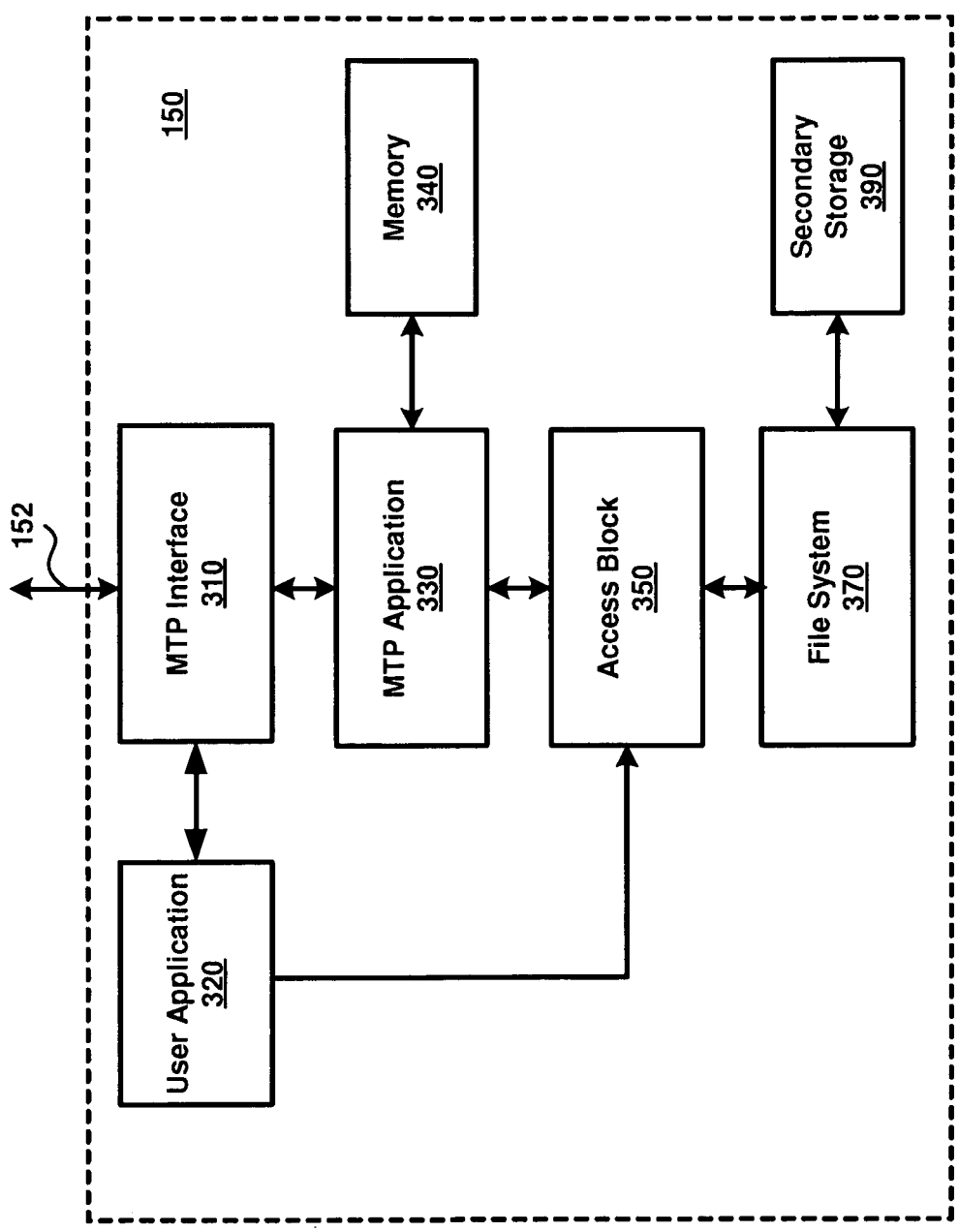
FIG. 3 is a block diagram illustrating the implementation of a digital processing system in an embodiment of the present invention.

FIG. 3 is a block diagram illustrating the details of a target in an embodiment of the present invention. Target system 150 is shown containing MTP interface 310, user application 320, MTP application 330, memory 340, access block 350, file system 370 and secondary storage 390. Each block is described below in further detail.

User application block 320 represents the instructions and hardware that together support the application of interest. For example, in the case of a media player, the hardware may include various physical buttons that can be pressed to provide commands such as play, stop, rewind, next song, etc. Memory 340 may contain both volatile (randomly accessible) units and persistent units, and thus some part of memory 340 can be integrated into secondary storage 390.

MTP block 330 implements the MTP protocol noted above. As pertinent to several aspects of the present invention and operation as an embedded device, MTP block 330 generates a unique (object) identifier for each of the entities (related to the source file system) sought to be saved. In addition, MTP block 330 stores/maintains the corresponding information (in a persistent manner as well) as a table in memory 340, as described below with respect to FIG. 4.

MTP block 330 uses the information in the table to determine the object identifier of a file with a (source) name in the source directory. If the file needs to be accessed, MTP block 330 forwards the access request, along with the determined object identifier, to access block 350. Access block 350 facilitates performance of the access request.

MTP block 330 may also respond to (authorized) requests for object identifiers of specific entities or to provide other requested information (such as parent). Though not described here in the interest of conciseness, MTP block 330 may support various other features described in the MTP specification noted above.

MTP interface 310 provides the various physical, electrical and transport protocol (e.g., USB, TCP/IP, LAN) interfaces when interfacing with external devices on path 152. Based on such a feature, it may be assumed that MTP interface 310 receives various MTP related transaction requests (to store a file, to retrieve a file, to provide an object identifier corresponding to an entity, etc.).

MTP interface 310 further receives various transaction requests (storing a file, retrieving file) from user application 320 or on path 152, and forwards the same to MTP application 330. The responses (once received from MTP block 330) are sent back on the same path on which the request is received.

Secondary storage 390 represents a non-volatile memory in which files are stored. The non-volatile memory can be implemented using various technologies such as magnetic memory (hard disk), flash memory, etc.. File system 370 specifies the manner in which each file is stored on secondary storage and can be implemented using various approaches well known in the relevant arts. In an embodiment described below, file system 370 is implemented as a FAT File system available on various personal computer systems as well.

Access block 350 receives the object identifiers of the files to be stored and performs the various operations noted with respect to FIG. 2 to store files. Thus, access block 350 determines the location and name of each file and then interfaces with file system 370 to cause the file to be stored with the determined name at the determined location (sub-directory) of a target directory.

Access block 350 may then permit retrieval of the files. Access block 350 determines the specific location and (target) name of the file based on the unique object identifier by performing the reverse-logic corresponding to the determination of step 240 described above. Various logics (with corresponding reverse-logic) will be apparent to one skilled in the relevant arts by reading the disclosure provided herein. The description is continued with an example of such logic, to illustrate the operation of access block 350 in one embodiment.

7. Example Storing

Figure 4:
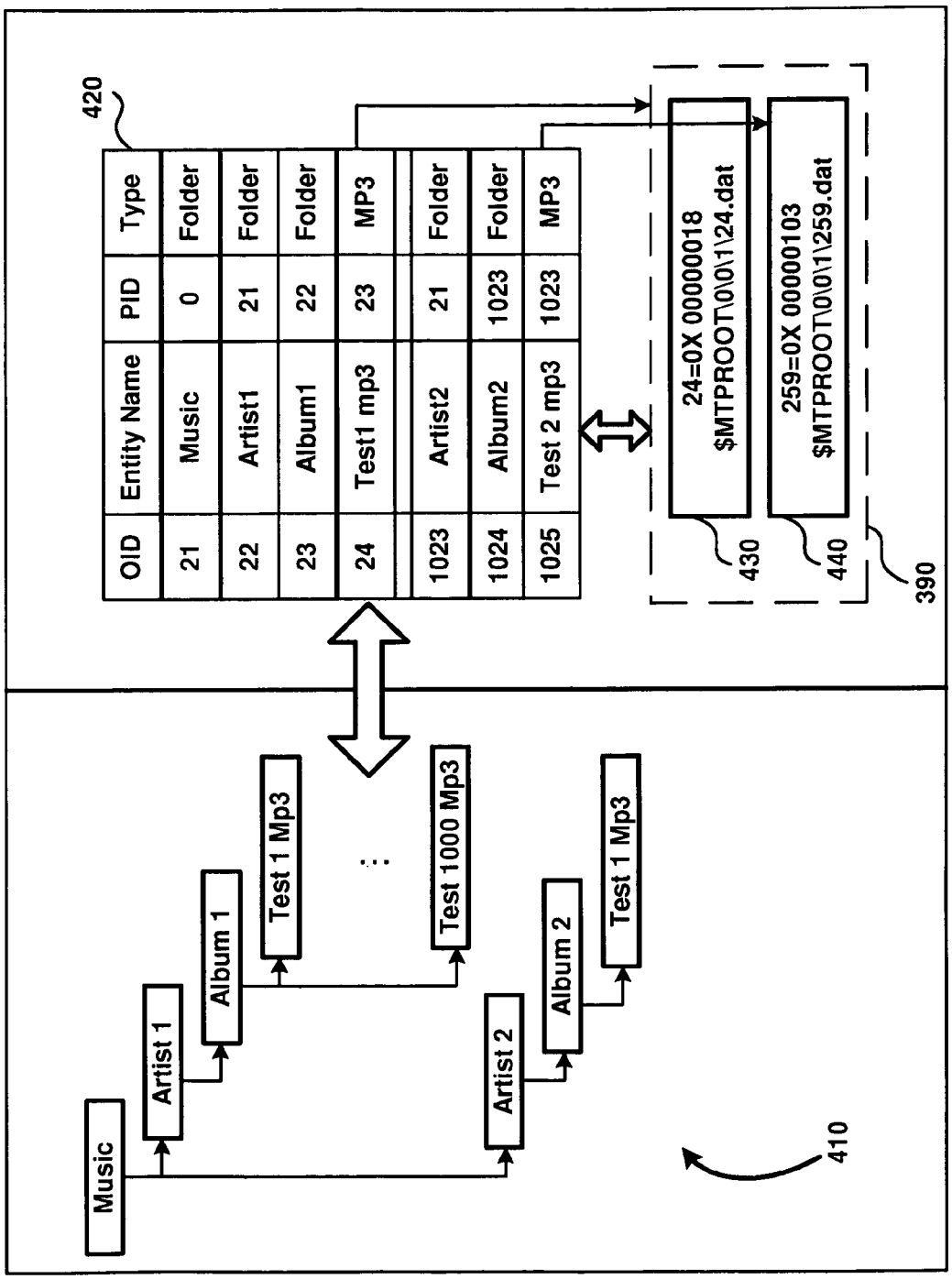
FIG. 4 is a block diagram illustrating the manner in which location and name are determined for each file in an embodiment.

FIG. 4 illustrates the manner in which the files are stored and retrieved in an embodiment of the present invention. For illustration, it is assumed that a source directory contains sub-directories and files (with source names) as depicted generally at 410. Thus, Music represents the name of the source directory that is to be copied, and having 'Artist 1' and 'Artist 2' as sub-directories. The sub-directory 'Artist 1' is shown with 1000 files/songs.

As may be appreciated, all the files have 'test' as a substantially overlapping portion in the respective names, which may present inefficiencies in searching as described above. As described below, the files are copied to the target directory to overcome at least some of the problems.

As described above, MTP assigns a unique object identifier for each of the entities sought to be stored via the 'virtual' file system (in the view of MTP). Table 420 depicts the corresponding information stored in memory 340.

The information corresponding to each entity is shown stored in a corresponding row. Each row has object identifier (OID), entity name, parent identifier (PID) and type. The OIDs are assumed to be assigned sequentially, though numbers/identifiers with other properties can be used. The parent identifier represents the object identifier of the parent in the hierarchy of the source directory. Thus, the information facilitates reconstruction of the hierarchy of the source directory though MTP provides a view of objects in a flat structure (with the object identifiers).

Based on the object identifiers and other information present in table 420, access block 350 may facilitate storing and retrieval of files according to several aspects of the present invention as described below in further detail.

Access block 350 may first determine a number of levels to be used in the target directory and the number of files to be stored in each sub-directory at the lowest level. In an embodiment, the following formula is used for such a determination:

$$16^{(X+Y)} = M \qquad \text{Equation (1)}$$

wherein X represents a number of nibbles (4 bits each) used for representing a level of the sub-directory;

Y represents a number of nibbles used for representing the files per sub-directory at the lowest level; and M represents the maximum number of MTP objects supported by the embedded Device.

Assuming $M=64K$ ($=16^4$), (X+Y) would need to equal 4. Assuming for illustration that X=3 and Y=1, it may be appreciated that 16 files can be stored in a single sub-directory at the lowest level.

Now assuming that each object identifier is designed to have 32 bits, LSBs 12-15 can be used to name the first level of sub-directory, LSBs 8-11 the second level, and LSBs 4-7 the third level. 16 files can be stored in each of the third level of sub-directories and the (target) name of the file can be based on LSBs 0-3. Using the above approach and representing the nibbles of above in hexadecimal notation, the location/filename would equal: "$MTPROOT/LSBs[12-15]/LSBs[8-11]/LSBs[4-7]/LSBs[0-3].dat. The files are stored in secondary storage 390 are shown by example files 430 and 440.

In the illustrative example, this will distribute 64 k objects across a directory structure no more than 4 levels (3 sub-directories+1 Root directory where all the MTP content is stored) with each having no more then 16 objects. For example, 16 files with RIDs from 1-16 are distributed as follows:

"$MTPROOT/0/0/0/1.dat
"$MTPROOT/0/0/0/2.dat
.
.
"$MTPROOT/0/0/0/15.dat
"$MTPROOT/0/0/0/1.dat However, alternative approaches can be chosen to use different number of sub-directories and/or to store files in non-leaf sub-directories as well. Further, while the above approach/logic demonstrates the manner in which files are stored with new target names, it should be appreciated the same logic can be employed to access a desired file. It is first assumed that user application 320 has determined the object identifier of the file sought to be accessed, for example, by interfacing with MTP interface. User application 320 may then request access block 350 for the file by providing the object identifier.

Alternatively, user application 320 may merely provide the source file name, and access block may determine the object identifier based on the information in the tables stored in memory 340.

Using the same approach noted above, access block 350 may map the object identifier to the location and a target file name. The file is then accessed using the determined location and file name.

Assuming the user application is a media player and the files represent songs with substantial overlapping names as noted above, it may be appreciated that the number of comparisons is reduced to a maximum of 16 since only the names of utmost 16 files may need to be compared. In contrast, if all of the files of 'music/artist 1/Test 1 mp3' directory of FIG. 4 were stored in the same directory, 1000 searches may have been required to locate a given file in the worst case.

For performance comparison, assuming the file system 370 is implemented as a FAT file system with a sector size of 512 bytes and each sector storing 10 names, about 100 sectors may need to be accessed when the files are not stored according to FIG. 2. On the other hand, when using the approach of FIG. 2, only 2 sectors may need to be accessed utmost before accessing the desired file. The desired files may be located and accessed quickly, thereby reducing wait time for user of media players.

The approach of above provides additional security as well, particularly in the context of digital rights management (DRM). As may be appreciated, the location and target file name on the secondary storage 390 are different from the source file name, in addition to be being determined by the unique identifier generated for the file. Thus, an intruder may not be able to quickly understand what the stored .dat files in the above example represent, thereby offering additional security.

Merely for illustration, it is assumed that files in a directory of source system 110 are copied to another directory in target system 150. However, several features of the present invention can be implemented when copying files from/to other types of systems and even within a single system.

Further, the problems/solutions described above are merely illustrative, though several features of the present invention can be adapted to other environments with corresponding different requirements/problems, as will be apparent to one skilled in the relevant arts by reading the disclosure provided herein.

It should be appreciated that the blocks/features described above can be realized by hardware, executable modules stored on a computer readable medium, or a combination of both. The description is continued with respect to an example digital processing system in which such features/blocks are implemented.

8. Digital Processing System

Figure 5:
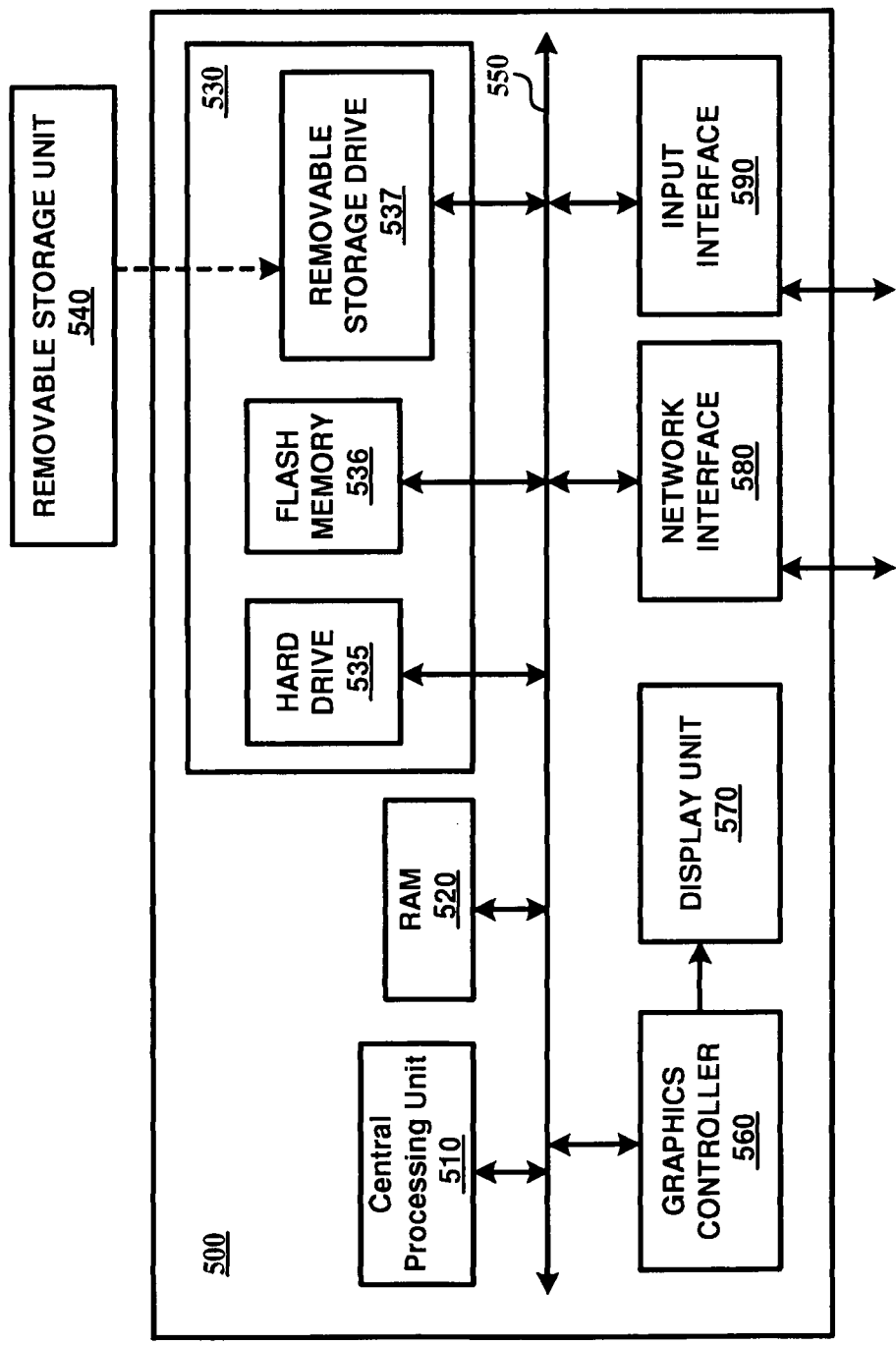
FIG. 5 is a block diagram illustrating an example embodiment in which several features of the present invention are operative upon execution of software instructions.

FIG. 5 is a block diagram illustrating the details of digital processing system 500 in which various aspects of the present invention are operative by execution of appropriate software instructions. Digital processing system 500 may correspond to target system 150.

Digital processing system 500 may contain one or more processors such as a central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention. CPU 510 may contain multiple processing units, with each processing unit potentially being designed for a specific task. Alternatively, CPU 510 may contain only a single general-purpose processing unit. RAM 520 may receive instructions from secondary memory 530 using communication path 550.

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and a pointing device (e.g., touch-pad, mouse) and may be used to provide inputs (e.g., to play/stop a song, in case of media players). Network interface 580 provides connectivity to a network (e.g., using Internet Protocol), and may be used to communicate with other connected systems.

Secondary memory 530 may contain hard drive 535, flash memory 536, and removable storage drive 537. Secondary memory 530 may store the data and software instructions, which enable digital processing system 500 to provide several features in accordance with the present invention.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

A module/block may be implemented as a hardware circuit containing custom very large scale integration circuits or gate arrays, off-the-shelf semiconductors such as logic chips, transistors or other discrete components. A module/block may also be implemented in programmable hardware devices such as field programmable gate arrays, programmable array logic, programmable logic devices, or the like.

Modules/blocks may also be implemented in software for execution by various types of processors. An identified module of executable code may, for instance, contain one or more physical or logical blocks of computer instructions which may, for instance, be organized as an object, procedure, or function. Nevertheless, the executables of an identified module need not be physically located together, but may contain disparate instructions stored in different locations which when joined logically together constitute the module/block and achieve the stated purpose for the module/block.

It may be appreciated that a module/block of executable code could be a single instruction, or many instructions and may even be distributed over several code segments, among different programs, and across several memory devices. Further, the functionality described with reference to a single module/block can be split across multiple modules/blocks or alternatively the functionality described with respect to multiple modules/blocks can be combined into a single (or other combination of blocks) as will be apparent to a skilled practitioner based on the disclosure provided herein.

Similarly, operational data may be identified and illustrated herein within modules and may be embodied in any suitable form and organized within any suitable type of data structure. The operational data may be collected as a single data set, or may be distributed over different locations including over different member disks, and may exist, at least partially, merely as electronic signals on a system or network.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the following description, numerous specific details are provided such as examples of programming, software modules, user selections, network transactions, database queries, database structures, hardware modules, hardware circuits, hardware chips, etc., to provide a thorough understanding of embodiments of the invention.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of copying a plurality of files stored in a first directory having a first hierarchy, said method comprising:
   sending a first name and a first location in said first hierarchy to a protocol application configured to generate a unique identifier for each of said plurality of files;
   receiving said corresponding unique identifier in response to sending said first name and said first location;
   determining a second name and a second location in a second hierarchy based on said unique identifier, said second hierarchy containing a second plurality of levels and said second hierarchy is not identical to said first hierarchy;
   maintaining a table indicating said corresponding unique identifier for each of said plurality of files; and
   storing said first file with said second name at said second location in said second hierarchy;
   wherein said protocol application is configured to receive the names of directories and names of files and to provide said corresponding unique identifier for each of said names of directories and names of files.

2. The method of claim 1, further comprising:
   repeating said sending, receiving determining and storing while treating each of said plurality of files as said first file such that all of said plurality of files are copied to a second directory with said second hierarchy.

3. The method of claim 2, wherein said second number of levels is more than a number of levels in which said plurality of files are stored in said first directory.

4. The method of claim 1, wherein said maintaining includes a type, the corresponding unique identifier and the name in each of a plurality of rows of said table.

5. The method of claim 4, wherein each of said plurality of files comprises a song and said first name of each song has a substantial overlapping portion and all of said plurality of files are stored in a single sub-directory of said first sub-directory,
   wherein said songs are stored in multiple sub-directories in said second directory.

6. A non-transitory computer readable medium storing one or more sequences of instructions for causing a system to store and retrieve files, wherein execution of said one or more sequences of instructions by one or more processors causes said system to perform the actions of:
   sending a first name and a first location in said first hierarchy to a protocol application configured to generate a unique identifier for each of said plurality of files;
   receiving said corresponding unique identifier in response to sending said first name and said first location;
   determining a second name and a second location in a second hierarchy based on said unique identifier, said second hierarchy containing a second plurality of levels and said second hierarchy is not identical to said first hierarchy;
   maintaining a table indicating said corresponding unique identifier for each of said plurality of files; and
   storing said first file with said second name at said second location in said second hierarchy;
   wherein said protocol application is configured to receive the names of directories and names of files and to provide said corresponding unique identifier for each of said names of directories and names of files.

7. The non-transitory computer readable medium of claim 6, further comprising:
   repeating said sending, receiving, determining and storing while treating each of said plurality of files as said first file such that all of said plurality of files are copied to a second directory with said second hierarchy.

8. The non-transitory computer readable medium of claim 7, wherein said second number of levels is more than a number of levels in which said plurality of files are stored in said first directory.

9. The non-transitory computer readable medium of claim 6, wherein said maintaining includes a type, the corresponding unique identifier and the name in each of a plurality of rows of said table.

10. The non-transitory computer readable medium of claim 9, wherein each of said plurality of files comprises a song and said first name of each song has a substantial overlapping portion and all of said plurality of files are stored in a single sub-directory of said first sub-directory.

* * * * *